United States Patent [19]

Triplett

[11] Patent Number: 4,530,666

[45] Date of Patent: Jul. 23, 1985

[54] WALK-IN GLOBE

[76] Inventor: James T. Triplett, P.O. Box 4, Chester, S.C. 29706

[21] Appl. No.: 632,907

[22] Filed: Jul. 20, 1984

[51] Int. Cl.³ .............................................. G09B 27/08
[52] U.S. Cl. .................................... 434/141; 434/131
[58] Field of Search ............... 434/131, 141, 145, 146, 434/287, 288, 148

[56] References Cited

U.S. PATENT DOCUMENTS

| | | | |
|---|---|---|---|
| 1,019,405 | 3/1912 | Atwood | 434/287 |
| 1,137,167 | 4/1915 | Pridmore | 434/131 X |
| 2,085,954 | 7/1937 | Churchill | 434/148 |
| 2,537,329 | 1/1951 | Campbell | 434/131 X |
| 3,683,517 | 8/1972 | Starworth | 434/137 |
| 3,769,929 | 11/1973 | Scheber | 272/115 X |

*Primary Examiner*—William H. Grieb

*Attorney, Agent, or Firm*—Dority & Manning

[57] ABSTRACT

A walk-in globe for permitting unobstructed viewing of a map of the world which includes a hollow sphere having a diameter substantially greater than that of the height of an adult person. The door provided in the sphere permits access for persons to enter the interior of the sphere. An accurately scaled map of the entire world covers the inner surface of the hollow sphere. In order to support the person within the globe, an elevated support platform is carried therein which supports a person at a height so that the eye level of the person standing on the support platform is substantially at the same level as the center of the sphere. Tracking mechanisms are provided for automatically giving the longitudinal and latitudinal coordinates of a particular location, and for automatically calculating the distances between the various locations shown on the map.

7 Claims, 3 Drawing Figures

WALK-IN GLOBE

BACKGROUND OF THE INVENTION

Heretofore, globes were constructed to simulate the earth by having a map of the earth secured to the outer surface of a sphere. When viewing different locations on opposite sides of such a globe, it is necessary to either rotate the globe or the viewer himself has to move to observe the globe from different sides. Such is not the most desirable way to trace by sight the path between different locations on the globe, since the movement of the globe or the moving of one's body affects the accuracy and sensitivity in analyzing and observing the relationships between different locations on the globe, particularly when those locations are on opposite sides of the globe.

In order to allow one to analyze and visualize the various areas of the globe in greater detail, globes have been made of various sizes. However, increasing the size of a globe also increases the difficulty in viewing the relationships or distances between various locations on the globe.

A typical globe is disclosed in U.S. Pat. No. 3,683,517. While recreational devices have been constructed in which people enter into a hollow sphere, such as disclosed in U.S. Pat. No. 3,769,929, to applicant's knowledge, there has never been constructed a globe which is of sufficient size to permit the entry of persons for viewing a map carried on the inner surface of the sphere.

The inside of the earth is a theoretical origin of navigation and heretofore, you have not been able to stand in the inside of a globe and calculate latitudinal and longitudinal coordinates by moving an instrument and also by physically seeing points on various parts of the earth by merely rotating only the head. When viewing a globe from the outside you can only see a small portion of the earth, and the maximum portion that can be seen without moving is one-half of the globe. The portion of the globe near the perimeter is distorted since the line of sight approaches a tangential line at the most remote point of the half of the globe being viewed, due to the curvature of the earth.

SUMMARY OF THE INVENTION

The globe constructed in accordance with the present invention is a walk-in globe that can be used for educational purposes, navigational purposes, and for simulating the tracking of aircraft and space vehicles as they circle the earth. The globe includes a hollow sphere which is large enough to hold a person. The diameter of the sphere is substantially greater than the height of an adult person. A door is provided in the wall of the sphere for providing access to persons entering the sphere. An accurately scaled map of the entire world covers the entire inner surface of the hollow sphere. An elevated support platform is carried in the sphere for supporting a person while viewing the map carried on the inner wall of the sphere. The support platform is carried in the hollow sphere at a height so that the eye level of a person standing on the support platform is substantially at the same level as the center of the sphere.

In one particular embodiment, a sighting device is positioned at substantially the center of the sphere and can be focused on the map carried on the inner surface of the sphere. A concentrated light beam is physically tied into the sighting device for aiding in aiming the sighting device at a particular location on the map. A coordinate calculating device produces digital signals indicating the longitudinal and latitudinal coordinates of a location sighted by the sighting device. Such information can be fed into a distance computer for computing the distance between two points along the inner surface of the globe corresponding to the actual distance between the two locations along the surface of the earth. One suitable device for performing the sighting is a theodolite, such as manufactured by Topcon and shown in more detail in the attached brochure.

Accordingly, it is an important object of the present invention to provide an educational globe having a map placed on the inner surface thereof, and the globe being of such a size as to permit persons to walk therein.

Another important object of the present invention is to provide an enlarged globe wherein the map is placed on the inside surface thereof, which permits easy tracking and visualizing of the distance between two locations on the earth by merely rotating one's head.

Another important object of the present invention is to provide an enlarged globe wherein persons can walk therein and view the entire world while standing in one position without having to rotate the globe or walk from one side of the globe to the other.

Still another important object of the present invention is to provide an enlarged globe having a map of the earth placed on the inner wall thereof, with a locational sighting device centrally located therein for producing signals indicating the coordinates of various locations on the earth and for also measuring the distance between various locations on the earth.

The construction designed to carry out the invention will be hereinafter described, together with other features thereof.

BRIEF DESCRIPTION OF THE DRAWINGS

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
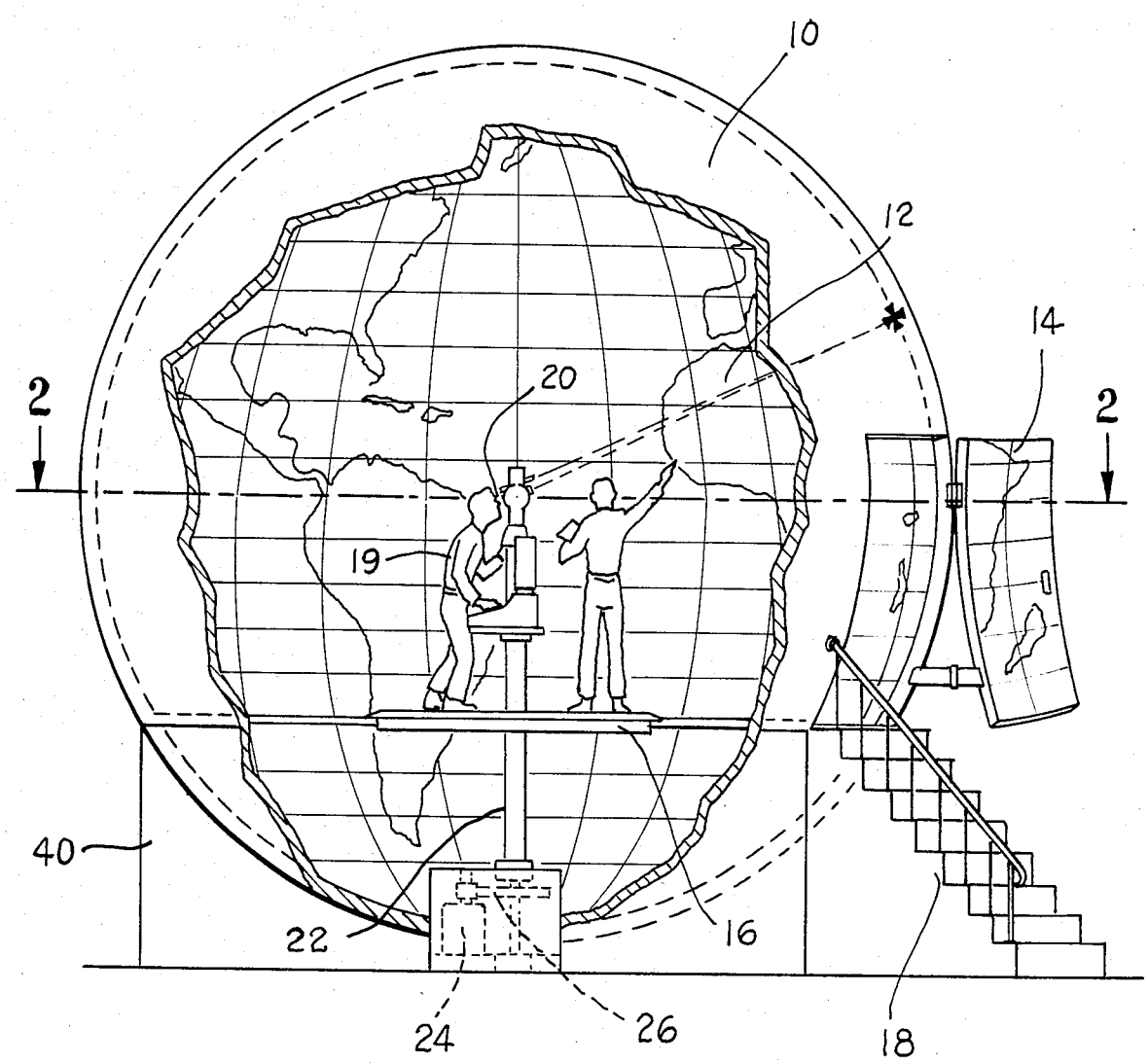
FIG. 1 is an enlarged perspective view, with parts cut away for purposes of clarity, illustrating a globe constructed in accordance with the present invention.
Figure 2:
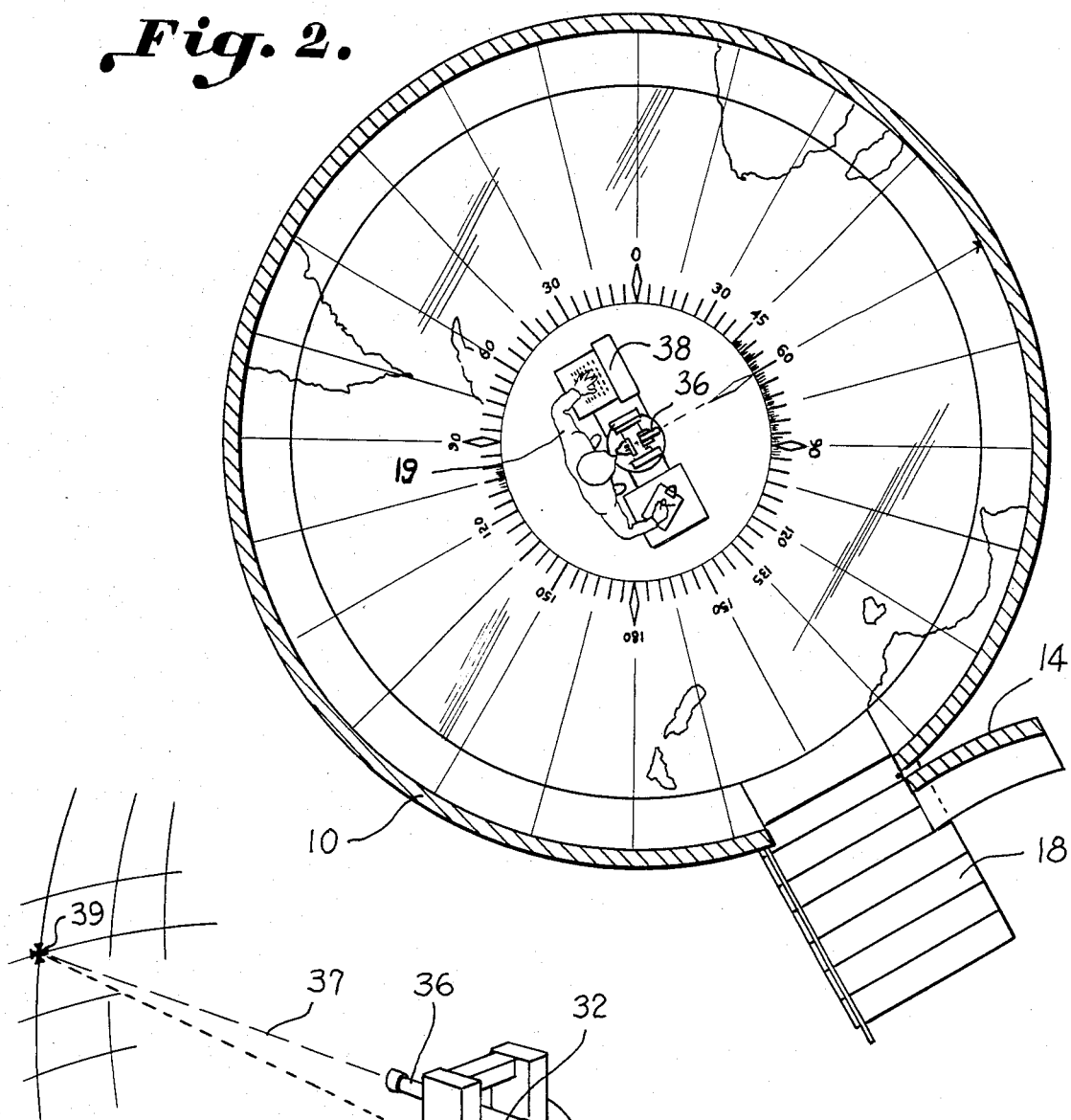
FIG. 2 is a sectional view taken along line 2—2 of FIG. 1.

FIG. 1 illustrates an enlarged globe which is hollow inside and has a diameter of approximately four times the height of a normal person. The globe 10 may be constructed of any suitable material such as fiberglass or re-enforced metal. In one particular embodiment, however, it is desirable to have the globe produced of translucent plastic material so that light may be transmitted from the outside of the globe inwardly to illuminate a map 12 of the earth secured to the inner surface of the globe 10 by any suitable means. The globe 10 has a door 14 provided in a wall thereof, for providing access to an elevated platform 16 located on a central vertically extending axis. Stairs 18 extend up to the door 14 for providing access to the elevated platform 16.

The elevated platform 16 is at a height sufficient so that when a person 19 is standing thereon his eye level 20 is approximately at the same level as the center of the sphere. The platform 16 is constructed of any suitable transparent material so as to permit a person 19 to see through the transparent platform 16 to view the lower portion of the earth, which in the embodiment shown in FIG. 1 would be the Antarctic. The platform 16 is supported on a rotatable shaft 22 that can be selectively driven by an electric motor 24 which is connected by means of a gearing arrangement 26 to a gear carried on the lower end of the rotatable shaft 22. The electric motor 24 can be manipulated by rotating a knob 28 located on a control panel 30.

Figure 3:
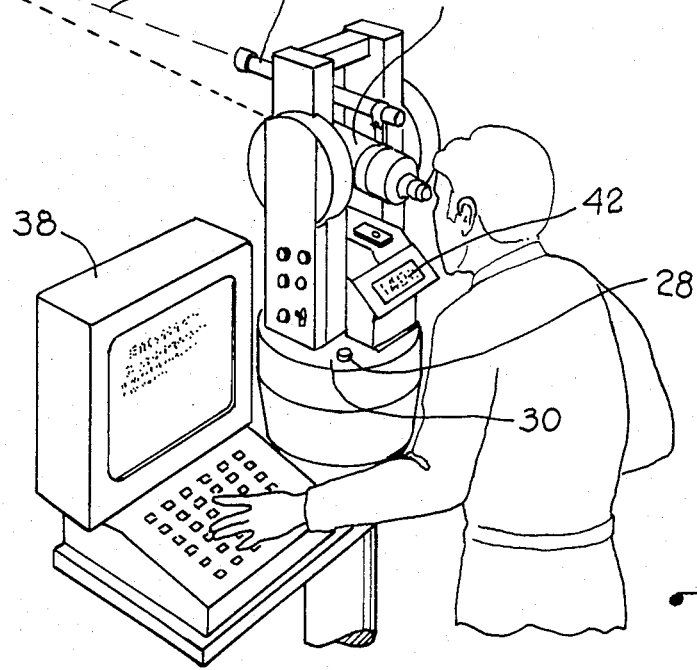
FIG. 3 is an enlarged perspective view illustrating the manner in which a person would sight various locations on a map carried within the globe of FIG. 1.

Positioned on the upper end of the vertically extending rotatable shaft 22 is a location sighting device 32 better shown in FIG. 3. One particular suitable location sighting device is a theodolite. One suitable theodolite is manufactured by Topcon and is referred to as an electronic digital theodolite DT-20. Positioned above the theodolite and secured thereto by any suitable means for movement therewith is a concentrated light beam source 36 which in one particular embodiment, may be a laser for producing a laser beam 37, which creates a distinct point 39 on the inner surface of the globe 10. The theodolite is capable of rotating in all directions for making tracings between various locations on the map 14 carried on the inner wall of the globe 10.

A conventional electronic distance computer 38 is electrically connected to the theodolite for calculating distances between various points carried on the inner surface of the globe 10. These calculations are made from the longitudinal and latitudinal coordinates assigned by the location sighting device 32. When the location sighting device 32 is first aligned with a particular location, a reading indicating the latitudinal and longitudinal coordinates of the location is fed into the computer from the location sighting device 32, or theodolite. The theodolite is then shifted to another location and is again lined up using the concentrated light beam 37. At the second location, another reading is taken, giving the longitudinal and latitudinal coordinates of the second location. The longitudinal and latitudinal coordinates of the two locations are then fed into the computer, and the computer automatically calculates the distance between the two locations.

The globe can be stationarily supported on any suitable structure such as indicated by the lines 40.

While a preferred embodiment of the invention has been described using specific terms, such description is for illustrative purposes only, and it is to be understood that changes and variations may be made without departing from the spirit or scope of the following claims.

What is claimed is:

1. A walk-in globe for educational purposes comprising:
a hollow sphere large enough to hold a person;
means for stationarily supporting the sphere;
an accurately scaled map of the entire earth substantially covering the entire inner surface of the sphere;
a door mounted on the sphere for allowing entry of a person into the interior of the sphere, so that upon entry of the person into the sphere, the person may view the accurately scaled map of the entire earth
a portion of said map being on an inside of said door;
an elevated support platform centrally located in said sphere for supporting a person while viewing said map carried on the inner surface of said sphere, said support platform being constructed of transparent material for allowing a person standing on said platform to have a substantially unobstructed view of the earth;
whereby a person can unobstructively view substantially the entire map so as to readily observe the relative distances between various locations on the map.

2. The walk-in globe as set forth in claim 1 further comprising:
said support platform being carried in said globe so that the eye level of a person standing on said platform is substantially at the same level as the center of said sphere.

3. The walk-in globe as set forth in claim 1 further comprising:
a rotatable location sighting device mounted on the support platform for sighting desired locations on the map; and
a coordinate calculating means for assigning the locations on the map located by the rotatable sighting device a longitude coordinate and a latitude coordinate.

4. The walk-in globe as set forth in claim 3, further comprising a distance computer mounted on the platform for inputting the longitudinal cordinates and the latitudinal coordinates assigned by the coordinate calculating means to the locations and for determining and outputting relative distances between the locations.

5. The walk-in globe as set forth in claim 3, further comprising:
a motorized rotating means connected to the rotatable location sighting device for selectively rotating the rotatable location sighting device; and
means carried on the support platform for selectively controlling the motorized rotating means so that the rotatable location sighting device may be selectively rotated to a desired position.

6. The device as set forth in claim 3, further comprising:
a digital readout connected to the coordinate calculating means for displaying the longitudinal and the latitudinal coordinates of the location.

7. The walk-in globe as set forth in claim 1, further comprising:
a rotatable location sighting device mounted on said elevated support at the center of said sphere; and
a concentrated light beam source forming part of said sighting device for creating a light beam which indicates the location on said map at which the said rotatable sighting device is pointed.

* * * * *